United States Patent
Bao et al.

(10) Patent No.: US 9,938,472 B2
(45) Date of Patent: Apr. 10, 2018

(54) METHOD FOR ENCLOSED RECYCLING OF OIL-WATER-SLUDGE IN OIL SHALE DRY DISTILLATION SYSTEM

(75) Inventors: Mingfu Bao, Liaoning (CN); Hualin Wang, Shanghai (CN); Dasong Xing, Liaoning (CN); Jiangang Wang, Shanghai (CN); Da Zhao, Liaoning (CN); Xin Cui, Shanghai (CN); Rongpu Zhang, Liaoning (CN); Yuan Huang, Shanghai (CN); Ling Shen, Shanghai (CN); Qiang Yang, Shanghai (CN); Yi Fan, Shanghai (CN)

(73) Assignees: Shanghai Huachang Enviromental Protection Co. Ltd., Shanghai (CN); Engineering Technology Research Center, Fushun Mining Group Co., Ltd., Liaoning (CN)

( * ) Notice: Subject to any disclaimer, the term of this patent is extended or adjusted under 35 U.S.C. 154(b) by 329 days.

(21) Appl. No.: 13/884,156

(22) PCT Filed: Dec. 13, 2011

(86) PCT No.: PCT/CN2011/083876
§ 371 (c)(1),
(2), (4) Date: Sep. 16, 2013

(87) PCT Pub. No.: WO2012/079499
PCT Pub. Date: Jun. 21, 2012

(65) Prior Publication Data
US 2014/0001098 A1    Jan. 2, 2014

(30) Foreign Application Priority Data

Dec. 14, 2010 (CN) .......................... 2010 1 0588007
Dec. 14, 2010 (CN) .......................... 2010 1 0588028

(Continued)

(51) Int. Cl.
*C10G 33/04* (2006.01)
*C10G 33/06* (2006.01)
(Continued)

(52) U.S. Cl.
CPC .............. *C10G 33/04* (2013.01); *C10B 53/06* (2013.01); *C10G 1/00* (2013.01); *C10G 1/002* (2013.01);
(Continued)

(58) Field of Classification Search
CPC .. C10G 5/05; C10G 5/00; C10B 53/06; C02F 11/12
See application file for complete search history.

(56) References Cited

FOREIGN PATENT DOCUMENTS

| CN | 101671572 | * | 3/2010 | ............... C10G 5/04 |
| CN | 102010732 |   | 4/2011 | |

(Continued)

OTHER PUBLICATIONS

English Translation of CN101671572.*

(Continued)

*Primary Examiner* — Renee Robinson
*Assistant Examiner* — Derek Mueller
(74) *Attorney, Agent, or Firm* — Greenberg Traurig, LLP; Fang Xie (57) ABSTRACT

The present invention relates to a method and a device for enclosed recycling of oil-water-sludge in an oil shale dry distillation system, comprising: scrubbing and condensing oil shale dry distillation gas at a gathering pipe section, a gas tower section, an air tower section, and a cooling tower section respectively to recycle shale oil section by section; using a separator at an outlet of each section to purify and collect the shale oil, while purifying and recycling scrubbing/cooling water; using multistage dedusters to remove oil sludge entrained in an oil-water product; using an oil sludge (Continued)

collecting tank and a filter after the deduster to concentrate and recycle an oil sludge; and using cyclones before and after the gas tower section to remove aerosol particles and water drops entrained in circulatory gas. Advantages include: low equipment investment costs, small occupation area, low failure rate, a highly pure shale oil product and a highly concentrated oil sludge product, and recycled waste water generated in the purification and concentration processes, thereby achieving full enclosure of the device system, greatly reducing the energy consumption, and improving the oil shale dry distillation process in the prior art.

9 Claims, 4 Drawing Sheets (30) Foreign Application Priority Data

| Dec. 14, 2010 | (CN) | .......................... 2010 1 0588034 |
| Dec. 14, 2010 | (CN) | .......................... 2010 1 0588072 |
| Dec. 14, 2010 | (CN) | .......................... 2010 1 0588084 |
| Aug. 10, 2011 | (CN) | .......................... 2011 1 0228990 |
| Aug. 10, 2011 | (CN) | .......................... 2011 1 0229012 |

(51) Int. Cl.

| *C10B 53/06* | (2006.01) |
| *C10G 1/00* | (2006.01) |
| *C10G 5/04* | (2006.01) |
| *C10G 33/02* | (2006.01) |
| *C10K 1/02* | (2006.01) |
| *C10K 1/04* | (2006.01) |
| *C10G 1/02* | (2006.01) |
| *C02F 11/12* | (2006.01) |

(52) U.S. Cl.
CPC ................. *C10G 1/02* (2013.01); *C10G 5/04* (2013.01); *C10G 33/02* (2013.01); *C10K 1/02* (2013.01); *C10K 1/04* (2013.01); *C02F 11/12* (2013.01); *C10G 2300/4081* (2013.01)

(56) References Cited

FOREIGN PATENT DOCUMENTS

| CN | 102010733 | 4/2011 |
| CN | 102021001 | 4/2011 |
| CN | 102021002 | 4/2011 |
| CN | 102021003 | 4/2011 |
| CN | 102021004 | 4/2011 |
| CN | 102031130 | 4/2011 |
| CN | 102070260 | 5/2011 |
| CN | 102092867 | 6/2011 |

OTHER PUBLICATIONS

Zevenhoven & Kilpinen, 2001, Particulates, Chapter 5, sec. 5-1: 5-31.*
PCT International Search Report issued in International Application No. PCT/CN2011/083876 dated Mar. 22, 2012.
Translation of International Preliminary Report on Patentability issued in International Application No. PCT/CN2011/083876 dated Jun. 27, 2013.

* cited by examiner

METHOD FOR ENCLOSED RECYCLING OF OIL-WATER-SLUDGE IN OIL SHALE DRY DISTILLATION SYSTEM

CROSS-REFERENCE TO RELATED APPLICATIONS

This application is a national phase filing under 35 U.S.C. 371 of International Application No. PCT/CN2011/083876 filed on Dec. 13, 2011, which claims the benefit of and priority to Chinese Patent Application No. 201010588084.7 filed Dec. 14, 2010, Chinese Patent Application No. 201010588072.4 filed Dec. 14, 2010, Chinese Patent Application No. 201010588034.9 filed Dec. 14, 2010, Chinese Patent Application No. 201010588028.3 filed Dec. 14, 2010, Chinese Patent Application No. 201010588007.1 filed Dec. 14, 2010, Chinese Patent Application No. 201110229012.8 filed Aug. 10, 2011, and Chinese Patent Application No. 201110228990.0 filed Aug. 10, 2011, all of which applications are hereby incorporated by reference in their entirety.

TECHNICAL FIELD

The invention pertains to the field of petrochemical refinement and environment protection, and relates to a method for enclosed recycling of oil-water-sludge in an oil shale dry distillation system, which is suitable for use in modification of an oil shale dry distillation process aiming at saving energy and promoting efficiency. In particular, the invention provides an improved method and device for purification of shale oil, concentration of oil-sludge, and recycling of water at a gathering pipe section, a gas tower section, an air tower section and a cooling tower section in an oil shale dry distillation system.

BACKGROUND ART

Oil shale is a resource associated with coal. The refining of raw oil and its byproducts using oil shale dry distillation technology had supported the economic development of China in the years of oil shortage. However, the amount of research and development of this technology had shrunk year by year. The shale oil resource contained in the oil shale around the world amounts to about 366.2 billion tons, at least 50% more than the traditional petroleum resource. The prospected and predicted amount of oil shale in China is 483.2 billion tons, which contains 29 billion tons of shale oil resource, ranking the fourth place in the world.

The countries that use oil shale to produce shale oil include Estonia, Brazil, China and Australia, etc. Brazil produced 195 kilotons of shale oil in 1999, China produced 200 kilotons of shale oil in 2006, and Australia produced 28 kilotons of shale oil in 2001, rising to 60 kilotons in 2002. Along with the advancement of technological development and application, as well as the strengthened awareness of environmental protection, it is a global trend to make full use of oil shale resource. It has become a trend to utilize oil shale in a more combined or diversified way.

At the beginning of 1990s, Fushun Mining Group Co., Ltd. adopted the concept of circular economy, and restarted the complex use of and research on oil shale, wherein emphasis is put on the refining of oil from oil shale.

At present, in the production of oil shale dry distillation, the output dry distillation product containing shale oil vapor, water vapor and dry distillation gas entrains a lot of shale powder dusts which form an oleophilic matter after adsorbing extremely fine oil fog during dust scrubbing, wherein the black, semi-solid clay-like matter that is produced during rigorous agitation and contains oil, water, and powder dust is called "oil sludge". The output of oil sludge varies with different operating conditions in production, generally accounting for 3-5‰ of the output of raw shale oil. The annual output of oil sludge in a shale refining plant is about 450-750 tons (based on 15 t/a raw oil output). The oil sludge in an oil shale refining plant is composed of a certain mass percentage (10-40%) of raw oil and 40-65% by mass of shale powder dust, heavy metal ions, inorganic salts and like substances, and has a density of 1.5~1.8 $g/cm^3$.

Oil sludge of shale dry distillation features high oil content and significant emulsification of oil phase, water phase and solid phase. Due to fine granularity and high density, shale powder dust is hard to separate by means of conventional methods, and may result in environmental pollution if not handled properly. Over the years, the shale oil industry has spared no effort and has invested tremendous manpower and resources, and has initiated scientific research projects. However, no effective method has been obtained. Some treatment methods adopted in current practice have limited effectiveness and can alleviate environmental pollution to some degree. However, these methods are still a far cry, in terms of quality and efficiency, from meeting the demands of the industrial development of shale oil refining and storage. Hazard-free green treatment of oil containing solid waste for elimination of environmental risk has good social and environmental benefit. In contrast, scientific green treatment of oil sludge not only can reclaim raw shale oil effectively to transform waste into treasure, but also provide good economic benefit.

Dry distillation of oil shale produces shale oil and oil sludge, together with large amount of dry distillation waste water. The product is essentially comprised of the following parts:

(1) associated water in the mixed gas emitted from the top of a dry distillation furnace, which is composed of the water contained in raw oil shale, the water contained in the main blowing air, the water evaporated from the water basin and a small amount of combined water, wherein this part of associated water passes through the whole process of the dry distillation of oil shale, exists in the form of water vapor, gradually condenses into water after entering the gathering pipe of the mixed gas, and is the main source of dry distillation waste water;

(2) drained water from processing and scrubbing of dry distillation product, which is the water generated during processing and scrubbing of dry distillate and recovery of shale oil;

(3) entrained water in the mixed gas emitted from the gathering pipe, which is generated from a portion of the oil/water drops entrained in the mixed gas emitted from the gathering pipe section and the incompletely cooled tar gas that continues cooling in a gas tower; and (4) drained water from circulatory cooling, which is the water generated during cooling the circulatory gas.

Dry distillation waste water has various types of pollutants, with complex compositions at high concentrations, which contains a relatively large amount of environmental pollutants such as organic sulfur, organic nitrogen, naphthenic acid compounds and fused-ring aromatic hydrocarbon compounds, etc., in addition to petroleum like substances and volatile phenol compounds conventionally found in natural oil plant. It is an organic waste water that is widely recognized as being difficult to handle, and is one of the industrial waste water types for which treatment technology is imported as of national importance. Waste water from dry distillation of shale has been treated in domestic and overseas laboratories successfully, but the experimentation came to a standstill due to relatively high facility investment and non-ideal economic benefit. Waste water treatment is relatively difficult.

In the common production process of oil shale dry distillation at present, the coke oven gas and tar from the outlet of the dry distillation furnace enter the gathering pipe at ambient pressure, wherein the oil sludge (a mixture of heavy oil and powder dust) is removed from the gas by circulatory water scrubbing. The scrubbing process is also a process for cooling and separation of the coke oven gas and coal tar.

Currently, the method for treating the dry distillation waste water from the gathering pipe section in the Fushun type oil shale dry distillation process is simple settlement of the waste water containing oil sludge in a sludge collecting tank, wherein the treated sludge is recycled to the gathering pipe directly. Specifically, the gathering pipe is inclined such that, after scrubbing, the scrubbing water, oil sludge and shale oil flow along the gathering pipe into the sludge collecting tank to achieve precipitation and separation. The water in the sludge collecting tank is drawn into the gathering pipe using a sludge collecting tank pump for circulatory use, and the oil sludge is discharged periodically from the sludge collecting tank and sent to the construction sector for further use. According to the method for separating oil sludge, sludge is generally removed by direct precipitation in the sludge collecting tank and multi-stage scrubbing. Apparently, this is quite undesirable for the collection of oil sludge.

Although zero discharge of waste water can be realized and a lot of costs for treating waste water can be saved by doing so, concern exists in heavy corrosion of equipment and in clogging and corrosion of pipes.

In the newest oil shale process, a scrubbing/saturation tower includes a gas tower and an air tower, and the scrubbing section is positioned at the bottom of these two towers. The gas tower acts to scrub or cool the forward mixed gas and circulatory gas, and the air tower acts to scrub or cool the forward mixed gas and main blowing air. The problem that the main blowing air entrains sludge is avoided in the air tower because all of the oil sludge has been removed in the preceding gas tower and the scrubbing section is located below the gas tower. The lower half of the gas tower is used to carry out secondary cooling and scrubbing of the mixed gas, while the upper half thereof carries out a new stage of scrubbing of the circulatory gas recycled from the cooling tower, to remove the tar therein thoroughly. A water seal is positioned at the interface between the upper and lower parts to prevent intermingling of the circulatory gas and the mixed gas. When the circulatory water is sprinkled down from the top of the tower, it passes through the water seal by virtue of overflowing, and scrubs or cools the circulatory gas and the mixed gas in sequence. By doing so, various problems of the scrubbing/ saturation tower have been solved. Addition of another stage of scrubbing or cooling process flow to each of the mixed gas and the circulatory gas further promotes the recovery yield of shale oil and the cooling effect, and prevents the problem of scale formation after oil dirt enters the heating furnace.

After scrubbing or cooling the circulatory gas and the mixed gas, the scrubbing/cooling water contains a relatively large amount of oil sludge and shale oil. Addition of a gas tower sludge remover and a gas tower oil remover at the bottom of the gas tower may well meet the demand of the circulatory use of the scrubbing/cooling water, and facilitate the recovery of shale oil and oil sludge as well.

So far, the treatment of oil sludge and waste water according to the existing oil shale dry distillation technology has never achieved fine separation or solved the environmental pollution problem associated with emission. Therefore, an urgent need exists in the art for development of a new treatment technology suitable for long-term operation to solve the above problems.

SUMMARY

The present invention provides a method and a device for enclosed recycling of oil-water-sludge in an oil shale dry distillation system, so that the problems existing in the prior art have been solved.

In one aspect, the present invention provides a method for enclosed recycling of oil-water-sludge in an oil shale dry distillation system, comprising:

(a) scrubbing a shale oil gas using a gathering pipe, to obtain a first oil-water-sludge three-phase product entraining oil sludge and a first dry distillation gas product, and condensing the first dry distillation gas product using a gas tower to obtain a second oil-water-sludge three-phase product and a second dry distillation gas product, wherein the shale oil gas was previously obtained by dry distillation and gasification;

(b) subjecting the first and second oil-water-sludge three-phase product to respective multi-stage dedusting treatment comprising at least a primary and a secondary dedusting treatment, so as to remove oil sludge entrained therein into a sludge phase and obtain a first and a second oil-water two-phase product, respectively;

(c) subjecting the second dry distillation gas product passing through an air tower and a cooling tower to water scrubbing and condensation respectively, so as to obtain a third oil-water two-phase product;

(d) subjecting the first, second and third oil-water two-phase products to oil-water separation treatment, so as to obtain a shale oil product having relatively lower water content;

(e) recovering aerosol particles formed from light oil microdrops, shale oil microdrops, water microdrops and the like contained in a first circulatory gas flowing out of the cooling tower by means of cyclonic capture or electrostatic capture; and removing the water drops entrained in a second circulatory gas flowing out of the gas tower by means of cyclonic capture;

(f) passing the shale oil product obtained after the oil-water separation treatment in step (d) and the aerosol particles recovered from the cooling tower in step (e) through a bus pipe to subsequent procedures for purifying an oil product, and metering the resulting oil product for output;

(g) recycling waste water removed by the oil-water separation treatment in step (d) for circulatory use as scrubbing/cooling water; and (h) subjecting sludge removed from the gathering pipe and the gas tower to further concentration, filtration and collection, so as to obtain a concentrated oil sludge product.

In a preferred embodiment, after the scrubbing and condensing treatment in Steps (a) and (c), the recovery yield of shale oil in each of the process sections may reach 60-70%.

In another preferred embodiment, after the primary dedusting treatment in Step (b), sludge content in the oil-water two-phase products is reduced to zero, while the water content in the sludge phase is reduced to 80-90%; and after the secondary or higher stage dedusting treatment, water content in the sludge phase is reduced to 60-65%. The oil-water two-phase products are recycled to a pressurizing pump before the dedusting treatment in a deduster.

In another preferred embodiment, after the dedusting treatment in Step (b), the rated pressure drop of a single stage solid-liquid separation is reduced to 0.1 MPa.

In another preferred embodiment, after the oil-water separation treatment in Step (d), the recovery yield of the shale oil product reaches 90-95%.

In another preferred embodiment, after the oil-water separation in Step (d), the rated pressure drop of a single stage oil-water separation is reduced to 0.2 MPa.

In another preferred embodiment, after the cyclonic capture or electrostatic capture in Step (e), the removal rate of the aerosol particles entrained in the first circulatory gas is more than 90%, and the aerosol content at the exhaust port is not greater than 20 mg/m$^3$.

In another preferred embodiment, after the treatment by virtue of gas-liquid cyclonic separation in Step (e), the rated pressure drop of a single stage gas-liquid separation is reduced to 0.1 MPa.

In another preferred embodiment, after the procedures of oil sludge filtration and concentration in Step (h), the removal rate of water in the sludge phase obtained by multi-stage dedusting treatment reaches 98-99%.

In another aspect, the invention provides a device for enclosed recycling of oil-water-sludge in an oil shale dry distillation system, comprising:

a gathering pipe 1, configured to scrub and condense a shale oil gas from dry distillation to produce a first oil-water-sludge three-phase product and a first dry distillation gas;

a sludge collecting tank 2 connected to the gathering pipe 1, configured for preliminary removal of sludge from the first oil-water-sludge three-phase product by precipitation;

a gathering pipe scrubbing pump 3-1 connected to the sludge collecting tank 2, configured to pressurize the first oil-water-sludge three-phase product;

a primary gathering pipe deduster 4-1 connected to the gathering pipe scrubbing pump 3-1, configured to remove oil sludge from the first oil-water-sludge three-phase product, and produce a first sludge phase and a first oil-water two-phase;

a gathering pipe separator 5 connected to the primary gathering pipe deduster 4-1, configured for preliminary purification of shale oil and purification of scrubbing/cooling water which is then recycled to the gathering pipe for continued use;

a secondary or higher stage gathering pipe deduster 4-2 connected to the primary gathering pipe deduster 4-1, configured to thicken the first sludge phase;

an oil sludge collecting tank 6 connected to the secondary or higher stage gathering pipe deduster 4-2, configured to collect oil sludge from the sludge phase by precipitation;

a filter pressurizing pump 3-2 connected to the oil sludge collecting tank 6, configured to pressurize the first sludge phase;

an oil sludge filter 7 connected to the filter pressurizing pump 3-2, configured to further dewater the first sludge phase to produce a concentrated sludge and a supernatant;

a filter water pump 3-3 connected to the oil sludge filter 7, configured to recycle the supernatant to the sludge collecting tank 2;

a gas tower 8 connected to the gathering pipe 1, configured to scrub and cool the first dry distillation gas and a first circulatory gas to produce a second oil-water-sludge three-phase product and a second dry distillation gas;

a gas tower bottom pump 9 connected to the gas tower 8, configured to pressurize the second oil-water-sludge three-phase product;

a primary gas tower deduster 10-1 connected to the gas tower bottom pump 9, configured to remove oil sludge from the second oil-water-sludge three-phase product and produce a second sludge phase and a second the oil-water two-phase product;

a gas tower separator 11 connected to the primary gas tower deduster 10-1, configured for preliminary purification of shale oil and clarification of scrubbing/cooling water which is then recycled to the gas tower 8 for circulatory use;

a secondary or higher stage gas tower deduster 10-2 connected to the primary gas tower deduster 10-1, configured to thicken the second sludge phase;

a circulatory gas liquid remover 12 connected to the gas tower 8, configured to remove water drops from the first circulatory gas;

an air tower 13 connected to the gas tower 8, configured to wet the main blowing air and scrub/cool the second dry distillation gas to produce a first scrubbed product and a third dry distillation gas;

an air tower bottom pump 14 connected to the air tower 13, configured to pressurize the first scrubbed product;

an air tower separator 15 connected to the air tower bottom pump 14, configured for preliminary purification of shale oil and clarification of scrubbing/cooling water which is then recycled to the air tower 13 for circulatory use;

a cooling tower 16 connected to the air tower 13, configured to cool and scrub the third dry distillation gas to produce a second scrubbed product and a second circulatory gas;

a cooling tower bottom pump 17 connected to the cooling tower 16, configured to pressurize the second scrubbed product;

a cooling tower separator 18 connected to the cooling tower bottom pump 17, configured for preliminary purification of shale oil and clarification of scrubbing/cooling water which is then recycled to the cooling tower for circulatory use; and an electrostatic capture tower or a cyclone 19 connected to the cooling tower 16, configured to remove the residual light oil microdrops, shale oil microdrops and water drops from the second circulatory gas.

In a preferred embodiment, the primary gathering pipe deduster 4-1 is arranged with the scrubbing pump and the sludge collecting tank in series, wherein the deduster may be selected from solid-liquid separating units such as solid-liquid cyclone, etc.

In another preferred embodiment, the primary gas tower deduster 10-1 is arranged with the gas tower bottom pump and the oil-water-sludge three-phase outlet of the gas tower in series, wherein the deduster may be selected from solid-liquid separating units such as solid-liquid cyclone, etc.

In another preferred embodiment, the secondary or higher stage gathering pipe deduster 4-2 and the secondary or higher stage gas tower deduster 10-2 mainly function to thicken the sludge, so as to facilitate further dewatering of the sludge in the oil sludge filter 7, wherein the deduster may be selected from solid-liquid separating units such as solid-liquid cyclone, etc.

In another preferred embodiment, the oil sludge filter 7 may be selected from horizontal spiral centrifuges or various filtering units.

In another preferred embodiment, the gathering pipe separator 5 is arranged with the liquid phase outlet of the gathering pipe deduster 4-1 in series, wherein the separator may be selected from liquid-liquid separating units such as liquid-liquid cyclone, etc.

In another preferred embodiment, the air tower separator 15 is arranged directly with the air tower bottom pump 14 and the oil-water two-phase outlet of the air tower 13 in series, wherein the separator may be selected from liquid-liquid cyclones.

In another preferred embodiment, the cooling tower separator 18 is arranged directly with the cooling tower bottom pump 17 and the oil-water two-phase outlet of the cooling tower 16 in series, wherein the separator may be selected from liquid-liquid cyclones.

In another preferred embodiment, the gas tower separator 11 is arranged mainly with the liquid phase outlet of the gas tower deduster 10-1 in series, wherein the separator may be selected from liquid-liquid cyclones.

In another preferred embodiment, the oil phase outlets of the gathering pipe separator 5, the gas tower separator 11, the air tower separator 15 and the cooling tower separator 18 may be connected to various oil-water separating tanks and metering devices to obtain high purity oil product.

In another preferred embodiment, the device is characterized by that the scrubbing/cooling waste water in each of the process sections is not discharged, but instead recycled directly to the top of the respective water scrubbing unit by virtue of simple mechanical separation for circulatory use, so as to realize full enclosure of the device.

DETAILED DESCRIPTION

After extensive and intensive study, the inventors of the present invention have discovered that:

The oil sludge in an oil shale dry distillation system mainly exists in the gathering pipe section and the gas tower section, and the shale powder dust in the dry distillation gas is already neglectable at the air tower section and the cooling tower section. The gathering pipe section is an important section in the production of shale oil, because a large amount of shale oil is recovered at this section. In addition, due to the presence of a large amount of oil sludge which is a mixture of shale powder dust and dry distillation tar at this section, the quality of the oil product at this section has never been high, and the quality of the oil product at subsequent process sections is also affected.

In addition, when the dry distillation gas from the gathering pipe enters the subsequent scrubbing/cooling part, if a gas tower and an air tower are used to replace the original scrubbing/saturation tower, i.e. the oil sludge in the dry distillation gas is removed by virtue of the gas tower in advance and scrubbing and cooling are carried out to some extent before wetting the main blowing air, such advantages that the circulatory gas is thoroughly scrubbed and the main blowing air does not contain oil sludge so as to prevent scale formation in the heating furnace are achieved.

Previously, in all of the process sections including gathering pipe, gas tower, air tower and cooling tower, since shale oil is extracted from the scrubbing/cooling circulatory water used to rinse tar and dry distillation gas in various process sections, a lot of water is inevitably present in the shale oil. In the past, only such measures as oil separation and the like are used to remove the water, which are often time consuming and labor intensive, but with no good effect. Particularly for some liquid drops having low density and small particle size, it is even harder for the method of gravity settling to take effect.

However, the centrifugal settling technology represented by cyclonic separation, as a separation method featuring both high efficiency and low energy consumption, may be used to address the challenges of oil purification and oil sludge separation. The invention is achieved on the basis of the above discoveries.

The technical concept of the invention is as follows:

The main product of an oil shale dry distillation system is shale oil, and the shale oil obtained by water scrubbing clarification process is the most direct oil product. However, oil sludge also contains 20-40% shale oil which can also be extracted by certain process and thus is an indirect oil product. In addition, it is required to reduce fresh water consumption and waste water treatment load for water scrubbing process. Therefore, recovery of oil, recovery of oil sludge and recycling of water constitute three important aspects of the present invention.

(1) The oil sludge recovery aspect: Oil sludge recovery systems are positioned at the gathering pipe section and the gas tower section. Based on the characteristic that the gathering pipe contains a lot of oil sludge, a sludge collecting tank system is positioned at the gathering pipe section, wherein a portion of the bulk oil sludge is removed by precipitation, and the overflow of the sludge collecting tank is pressurized by a gathering pipe scrubbing pump and then enters a primary deduster. The liquid phase in the primary deduster enters a subsequent oil-water separator. The sludge phase contains a lot of water, and thus can not be allowed to enter an oil sludge filter directly to be dewatered. Instead, it goes on to enter a secondary deduster for concentration of oil sludge. Owing to the thickening function of the secondary or higher stage deduster, the water content of oil sludge is reduced from 80-90% at the outlet of the primary deduster to 60-65%, so that this phase meets the concentration required for feeding into the oil sludge filter to be dewatered. The liquid phase in the secondary or higher stage deduster is recycled directly to the inlet of the gathering pipe scrubbing pump for circulation. Similarly, owing to the pressurizing function of a bottom pump at the bottom of the gas tower, the water scrubbed three-phase product of the dry distillation gas at this process section is fed into a gas tower deduster, wherein the oil-water mixture from the liquid phase outlet of the primary deduster enters a subsequent oil-water separator, and the product from the sludge phase outlet of the secondary or higher stage deduster enters an oil sludge filter to be dewatered.

(2) The shale oil recovery aspect: Shale oil is purified efficiently by mainly using oil-water separators. At the gathering pipe section and the gas tower section, the inlets of the oil-water separators are connected mainly to the liquid phase outlets of the primary dedusters; while at the air tower section and the cooling tower section, the inlets of the oil-water separators are connected mainly to the outlets of the bottom pumps of the air tower and the cooling tower. Owing to the purification function of the oil-water separators, the recovery yields of the oil product at the inlets and outlets of the separators are up to 90-95%. In the cooling tower, the dry distillation gas has been recovered almost completely by water cooling and scrubbing, and only some light oil microdrops and few shale oil microdrops are left and flow out of the cooling tower along with the circulatory gas carrier gas. At this time, recovery of this part of oil product may be implemented by disposition of an electrostatic capture tower or a gas-liquid cyclone, so as to promote the shale oil recovery yield of the whole set of facility.

(3) The scrubbing/cooling water recycling aspect: The scrubbing/cooling water is clarified efficiently by mainly using oil-water separators while shale oil is purified. The oil content at the water phase outlets of the separators is below 5%, and the problems such as scale formation will not occur when the water is recycled to the tower tops of the units. Additionally, recycling of the cooling water allows full enclosure of the device, and it is unnecessary to purify the scrubbing/cooling water, resulting in significant saving in energy consumption. Furthermore, addition of a primary gas-liquid cyclone in the line, through which the circulatory gas in the gas tower flows back to the heating furnace, to remove water drops therein may also help reduce energy consumption and avoid scale formation in the heating furnace.

EXAMPLES

The invention will be further illustrated with reference to the following specific examples. It is to be understood that these examples are merely intended to demonstrate the invention without limiting the scope thereof. The experimental methods in the following examples for which no specific conditions are indicated will be carried out generally under conventional conditions or under those conditions suggested by the manufacturers.

Figure 1:
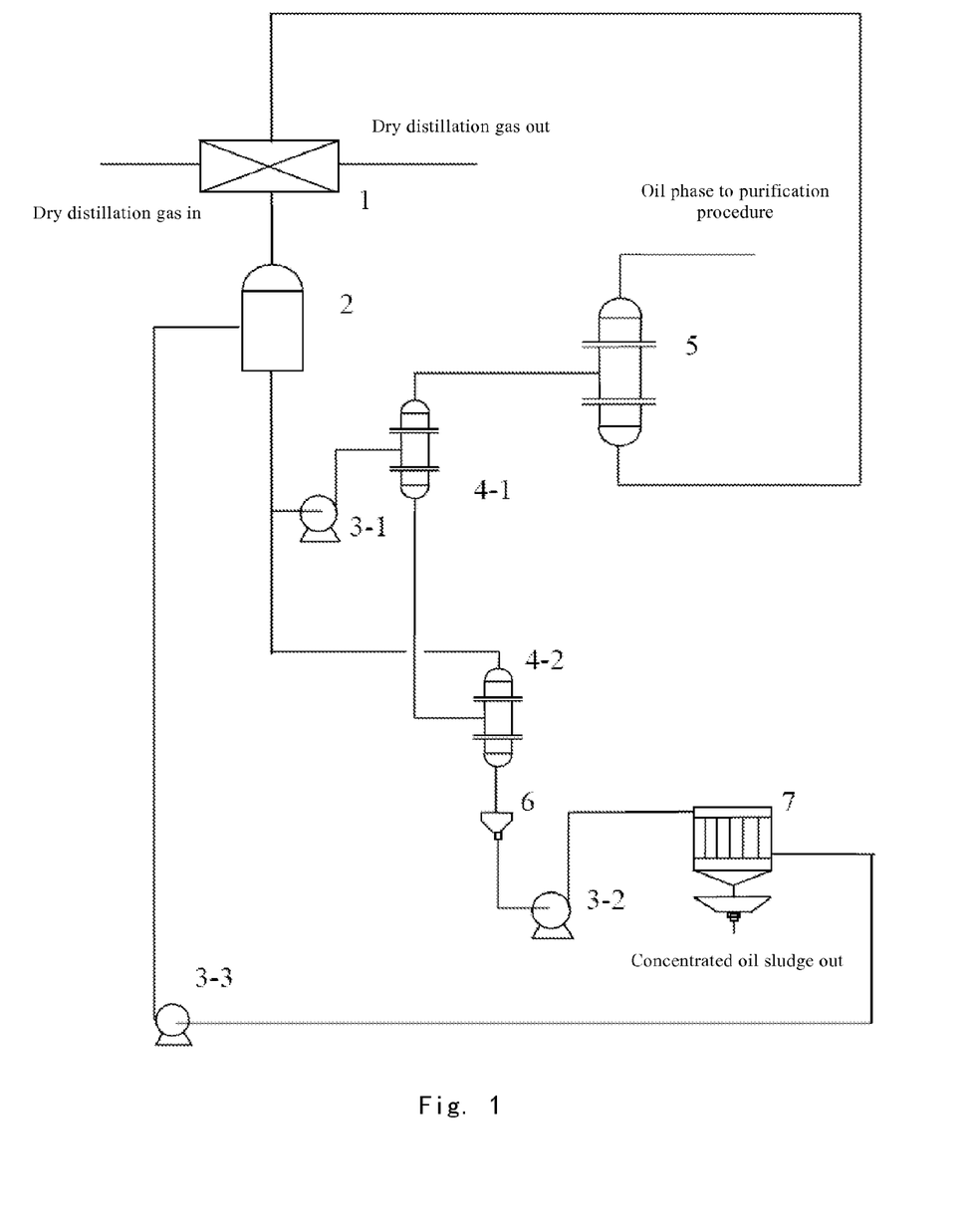
FIG. 1 is a process flow chart of oil-water-sludge recycling at the gathering pipe section in an oil shale dry distillation system according to one embodiment of the invention.

Example 1: The Device of the Present Application is Adopted in the Retrofit Program of the Gathering Pipe Section in an Oil Shale Dry Distillation Device Based on the Technology of Energy Saving and Emission Reduction The schematic process flow chart is shown in FIG. 1:

An HL/S Model Liquid-solid Microcyclone, developed by East China University of Science and Technology independently, is selected in this technical solution to be used as a gathering pipe deduster for removal of sludge from shale oil and concentration of oil sludge; and an HL/L Model Liquid-liquid Microcyclone is selected as an oil-water separator at the gathering pipe section for purification of shale oil product. The oil shale dry distillation tar gas from a dry distillation furnace enters a gathering pipe 1 to be cooled and scrubbed, and the shale oil gas enters a subsequent gas tower 8. At the same time, the oil-water mixture exiting from the water outlet port of the gathering pipe contains a lot of shale powder dust, heavy metal ions, inorganic salts and raw oil, shale powder dust and various impurities, and oil sludge formed therefrom by adsorption of raw oil fog. The oil sludge has a very wide particle size distribution. In the gathering pipe, the particle size lies mainly in the range of 0.7-101.6 microns, and the median particle size is about 8 microns. Excessively fine particles render gravity settling difficult to be carried out, or settling time too long. Thus, the specially designed HL/S Model Liquid-solid Microcyclone is used as the dedusting unit. Additional multi-stage dedusters are positioned at the bottom of the gathering pipe 1 and a sludge collecting tank 2. Oil sludge enters the sludge collecting tank 2 together with the oil-water mixture. After a portion of the sludge precipitates, the remaining is pressurized by a scrubbing pump 3-1 and then enters a primary gathering pipe deduster 4-1 for pre-separation. The light phase, i.e. the liquid phase in the deduster 4-1, enters a subsequent gathering pipe separator 5 for oil product purification and circulatory water clarification. The resulting shale oil product enters a subsequent oil separation pool or other oil-water separation tank as well as a metering system. The clarified cooling water is recycled to the top of the gathering pipe for repeated use, and the recovery yield of the oil product is up to 90-95%. The heavy phase in the deduster enters a secondary gathering pipe deduster 4-2 in tandem (or further enters a tertiary gathering pipe deduster after the above procedure is repeated) for the second (or third) separation. After twice dedusting separation, the recovery yield of oil sludge is about 92%, and the water content in oil sludge is about 65-80%. After concentrated, the oil sludge enters an oil sludge collecting tank 6 and is pressurized periodically using a filter pressurizing pump 3-2. Then, the oil sludge enters an oil sludge filter 7 to remove the supernatant by means of centrifugal force and filter mesh. The concentrated oil sludge comes out of the device as the product, and the dewatering rate of the final oil sludge product is up to 98%. The following table lists the system working conditions and separation effects of the HL/S Model Liquid-solid Microcyclone and the HL/L Model Liquid-liquid Microcyclone as the deduster and the separator at the gathering pipe section.

|  | Inlet of gathering pipe deduster | Inlet of gathering pipe oil remover | Underflow port of gathering pipe oil remover |
| --- | --- | --- | --- |
| Flow rate, m³/h | 200 | 180 | 171 |
| Dust content, kg/m³ | 0.957 | 0.082 | 0.251 |
| Oil content, kg/m³ | 26.070 | 23.953 | 2.124 |

Figure 2:
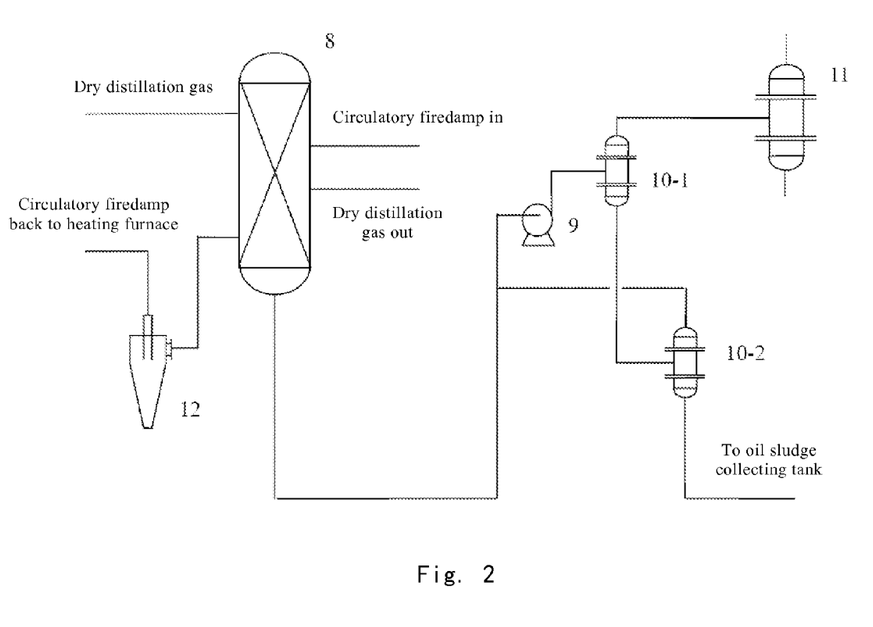
FIG. 2 is a process flow chart of oil-water-sludge recycling at the gas tower section in an oil shale dry distillation system according to another embodiment of the invention.

Example 2: The Device of the Present Application is Adopted in the Retrofit Program of the Gas Tower Section in an Oil Shale Dry Distillation Device Based on the Technology of Energy Saving and Emission Reduction The schematic process flow chart is shown in FIG. 2:

An HL/S Model Liquid-solid Microcyclone, developed by East China University of Science and Technology independently, is selected in this technical solution to be used as a gas tower deduster for removal of sludge from shale oil and concentration of oil sludge; an HL/L Model Liquid-liquid Microcyclone is selected as an oil-water separator at the gas tower section for purification of shale oil product; and an HL/G Model Gas-liquid Microcyclone is selected as a circulatory gas liquid remover. The oil-water-sludge three-phase separation process at the bottom of the gas tower is similar. However, the sludge content at the gas tower section is relatively small, the oil sludge particle size is much smaller than the former, and the concentrations differ by near ten times. Thus, the specially designed microcyclone is used as the separation unit, and buffering and oil sludge collection by a sludge collecting tank are exempted. The particle size of the oil sludge at the gas tower section lies mainly in the range of 0.3-74.1 microns, and the median particle size is about 6 microns.

After scrubbed and cooled in the gas tower 8, the dry distillation gas enters a subsequent air tower 13. Additional multi-stage dedusters are positioned at the water outlet port of the tower bottom. After pressurized by a gas tower bottom pump 9, oil sludge enters a primary gas tower deduster 10-1 along with the oil-water mixture for pre-separation. The light phase, i.e. the liquid phase in the deduster 10-1, enters a subsequent gas tower separator 11 for oil product purification and circulatory water clarification. The resulting shale oil product enters a subsequent oil separation pool or other oil-water separation tank as well as a metering system. The clarified cooling water is recycled to the top of the gathering pipe for repeated use, and the recovery yield of the oil product is up to 90-95%. The heavy phase in the deduster enters a secondary gas tower deduster 10-2 in tandem (or further enters a tertiary gathering pipe deduster after the above procedure is repeated) for the second (or third) separation. After twice dedusting separation, the recovery yield of oil sludge is about 92%, and the water content in oil sludge is about 70-80%. After concentrated, the oil sludge enters an oil sludge collecting tank 6 and is pressurized periodically using a filter pressurizing pump 3-2. Then, the oil sludge enters an oil sludge filter 7 to remove the supernatant by means of centrifugal force and filter mesh. The concentrated oil sludge comes out of the device as the product, and the dewatering rate of the final oil sludge product is up to 98%.

Additionally, after a new round of scrubbing and cooling of the circulatory gas that is recycled from an electrostatic capture tower (or a cyclone) 19 and enters the gas tower, a circulatory gas liquid remover 12 is used to remove the water entrained therein, so as to guarantee the purity of the gas that is recycled to a heating furnace.

The following table lists the system working conditions and separation effects of the HL/S Model Liquid-solid Microcyclone and the HL/L Model Liquid-liquid Microcyclone as the deduster and the separator at the gas tower section.

|  | Inlet of firedamp tower deduster | Inlet of firedamp tower oil remover | Underflow port of firedamp tower oil remover |
| --- | --- | --- | --- |
| Flow rate, m³/h | 500 | 450 | 427.5 |
| Dust content, kg/m³ | 0.292 | 0.010 | 0.211 |
| Oil content, kg/m³ | 17.824 | 15.059 | 1.393 |

Figure 3:
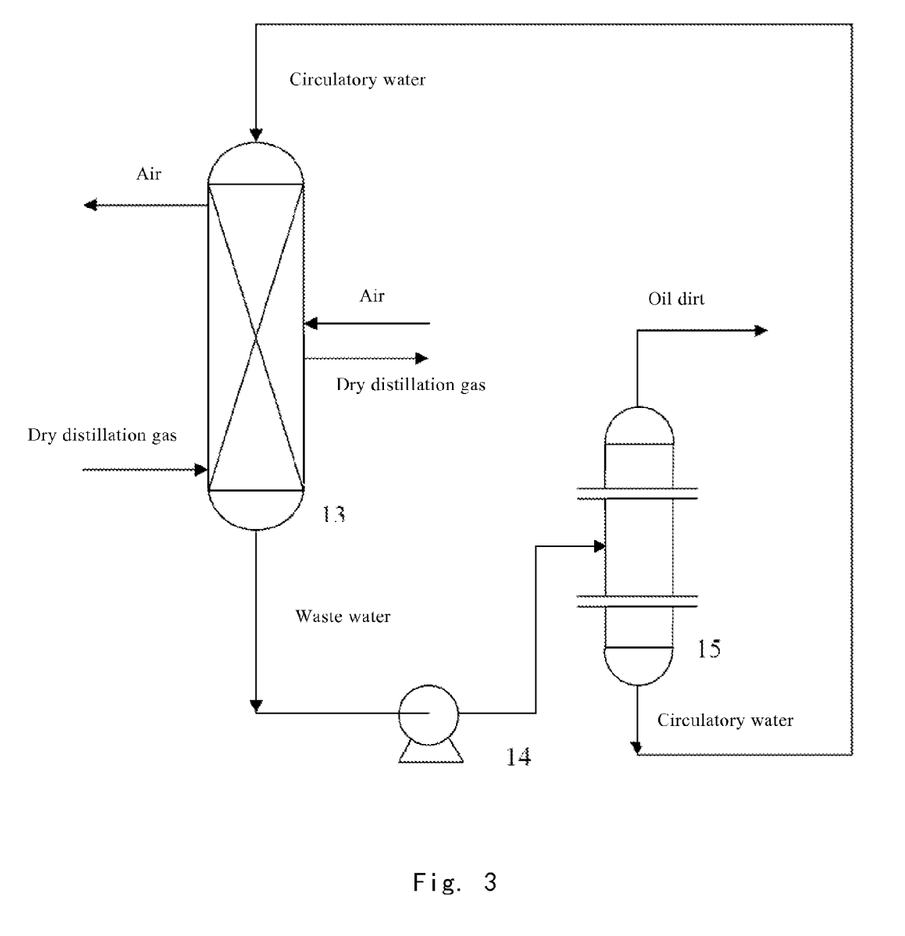
FIG. 3 is a process flow chart of oil-water recycling at the air tower section in an oil shale dry distillation system according to yet another embodiment of the invention.

Example 3: The Device of the Present Application is Adopted in the Retrofit Program of the Air Tower Section in an Oil Shale Dry Distillation Device Based on the Technology of Energy Saving and Emission Reduction The schematic process flow chart is shown in FIG. 3:

An HL/L Model Liquid-liquid Microcyclone, developed by East China University of Science and Technology independently, is selected as an oil-water separator at the air tower section for purification of shale oil product. For the air tower section, since substantially no oil sludge exists, the process mainly involves oil product purification and cooling water clarification/recycling. The oil output at the air tower section is relatively reduced, and thus the specially designed HL/L Model Liquid-liquid Microcyclone is mainly used to separate shale oil and clarified water.

The dry distillation gas flowing out of the gas tower goes on to enter an air tower 13 for a new stage of cooling and scrubbing. In addition, the air tower also functions to wet the main blowing air, and scrub the air which is then transported into related units. After pressurized by an air tower bottom pump 14, the oil-water mixture enters a subsequent air tower separator 15 for oil product purification and circulatory water clarification. The resulting shale oil product enters a subsequent oil separation pool or other oil-water separation tank as well as a metering system. The clarified cooling water is recycled to the top of the air tower for repeated use, and the recovery yield of the oil product is up to 90-95%.

The following table lists the system working conditions of the HL/L Model Liquid-liquid Microcyclone as the deduster and the separator at the air tower section.

|  | Inlet of air tower oil remover | Underflow port of air tower oil remover |
| --- | --- | --- |
| Flow rate, m³/h | 350 | 332.5 |
| Dust content, kg/m³ | 0 | 0 |
| Oil content, kg/m³ | 11.676 | 1.633 |

Figure 4:
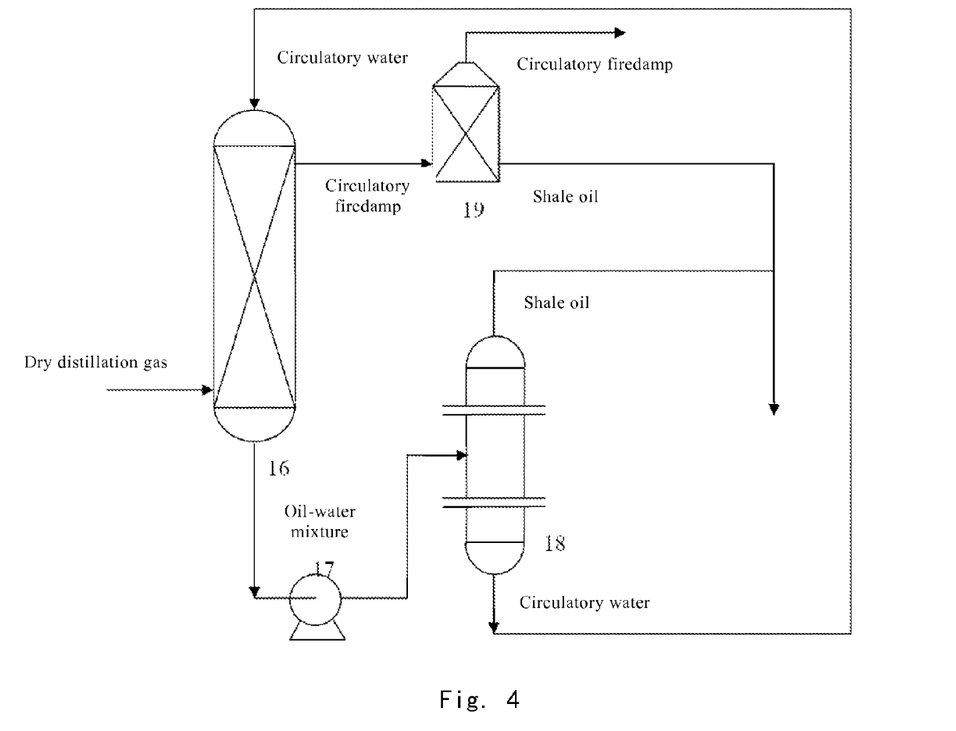
FIG. 4 is a process flow chart of oil-water recycling at the cooling tower section in an oil shale dry distillation system according to still another embodiment of the invention.

Example 4: The Device of the Present Application is Adopted in the Retrofit Program of the Cooling Tower Section in an Oil Shale Dry Distillation Device Based on the Technology of Energy Saving and Emission Reduction The schematic process flow chart is shown in FIG. 4:

For the cooling tower section, since substantially no oil sludge exists as well, the process also mainly involves oil product purification and cooling water clarification/recycling. The oil output at the cooling tower section is also relatively reduced, and thus the specially designed HL/L Model Liquid-liquid Microcyclone is mainly used to separate shale oil and clarified water.

The dry distillation gas flowing out of the air tower goes on to enter a cooling tower 16 for a new stage of cooling and scrubbing. After pressurized by a cooling tower bottom pump 17, the oil-water mixture enters a subsequent cooling tower separator 18 for oil product purification and circulatory water clarification. The resulting shale oil product enters a subsequent oil separation pool or other oil-water separation tank as well as a metering system. The clarified cooling water is recycled to the top of the cooling tower for repeated use, and the recovery yield of the oil product is up to 90-95%.

After multi-stage scrubbing of the dry distillation gas, the oil product has substantially been recovered completely. Few oil drops and water drops are entrained in the remaining circulatory gas. In order to recover this part of shale oil more thoroughly, an electrostatic capture tower (or a cyclone) 19 is disposed to remove the shale oil therein. Then the circulatory gas is recycled to the gas tower for scrubbing, and then enters a heating furnace to be heated for continuing use as a heat carrier gas. This part of oil product enters an oil product bus pipe, and then enters a subsequent oil separation pool or other oil-water separation tank as well as a metering system.

The following table lists the system working conditions of the HL/L Model Liquid-liquid Microcyclone as the deduster and the separator at the cooling tower section.

|  | Inlet of cooling tower oil remover | Underflow port of cooling tower oil remover |
|---|---|---|
| Flow rate, $m^3/h$ | 350 | 332.5 |
| Dust content, $kg/m^3$ | 0 | 0 |
| Oil content, $kg/m^3$ | 9.583 | 0.895 |

All of the documents mentioned in the invention are incorporated herein by reference, as if each of them was incorporated herein individually by reference. It is to be further understood that various changes or modifications can be made by those skilled in the art after reading the above teachings of the invention, and these equivalent variations fall in the scope defined by the accompanied claims of the application as well.

What is claimed is:

1. A method for enclosed recycling of oil-water-sludge in an oil shale dry distillation system, comprising:
    (a) scrubbing a shale oil gas using a gathering pipe to obtain a first oil-water-sludge three-phase product entraining oil sludge and a first dry distillation gas product, and condensing the first dry distillation gas product using a gas tower to obtain a second oil-water-sludge three-phase product and a second dry distillation gas product, wherein the shale oil gas was previously obtained by dry distillation and gasification;
    (b) subjecting the first and second oil-water-sludge three-phase products to respective multi-stage dedusting treatment comprising at least a primary and a secondary dedusting treatment, so as to remove oil sludge entrained therein into a sludge phase and obtain a first and a second oil-water two-phase product, respectively;
    (c) subjecting the second dry distillation gas product passing through an air tower and a cooling tower to water scrubbing and condensation, so as to obtain a third oil-water two-phase product;
    (d) subjecting the first, second, and third oil-water two-phase products to distinct oil-water separation treatments, so as to obtain a shale oil product having relatively lower water content;
    (e) recovering aerosol particles formed from light oil microdrops, shale oil microdrops and water microdrops contained in a first circulatory gas flowing out of the cooling tower by means of cyclonic capture; and removing water drops entrained in a second circulatory gas flowing out of the air tower by means of cyclonic capture;
    (f) passing the shale oil product obtained after the oil-water separation treatment in step (d) and the aerosol particles recovered from the cooling tower in step (e) through a bus pipe to subsequent procedures for purifying an oil product, and metering the resulting oil product for output;
    (g) recycling waste water removed from the oil-water separation treatment in step (d) for circulatory use as scrubbing/cooling water; and
    (h) subjecting the sludge phase obtained from step (b) to further concentration, filtration and collection, so as to obtain a concentrated oil sludge product.

2. The method of claim 1, wherein, after each of Steps (a) and (c), shale oil recovery yield of 60-70% is reached.

3. The method of claim 1, wherein in Step (b), after the primary dedusting treatment sludge content in the oil-water two-phase products is reduced to zero, while water content in the sludge phase is reduced to 80-90%; after the secondary or higher stage dedusting treatment, water content in the sludge phase is reduced to 60-65%; and the oil-water two-phase products are recycled to a pressurizing pump inlet before the dedusting treatment.

4. The method of claim 1, wherein, after the dedusting treatment in Step (b), a rated pressure drop is reduced to 0.1 MPa.

5. The method of claim 1, wherein, after the oil-water separation treatment in Step (d), recovery yield of the shale oil product reaches 90-95%.

6. The method of claim 1, wherein, after the oil-water separation treatment in Step (d), a rated pressure drop of a single stage oil-water separation is reduced to 0.2 MPa.

7. The method of claim 1, wherein, after the cyclonic capture in Step (e), removal rate of the aerosol particles entrained in the first circulatory gas is more than 90%, and aerosol content at an exhaust port of the first circulatory gas is no greater than 20 $mg/m^3$.

8. The method of claim 1, wherein, after Step (e), a rated pressure drop is reduced to 0.1 MPa.

9. The method of claim 1, wherein, after Step (h), removal rate of water in the sludge phase obtained by the multi-stage dedusting treatment in Step (b) reaches 98-99%.

* * * * *